Jan. 5, 1943. J. K. NORTHROP ET AL 2,307,708
MONOCOQUE STRUCTURE
Filed June 10, 1940 4 Sheets-Sheet 1

INVENTORS,
JOHN K. NORTHROP.
VLADIMIR H. PAVLECKA.
BY
Lippincott & Metcalf
ATTORNEYS.

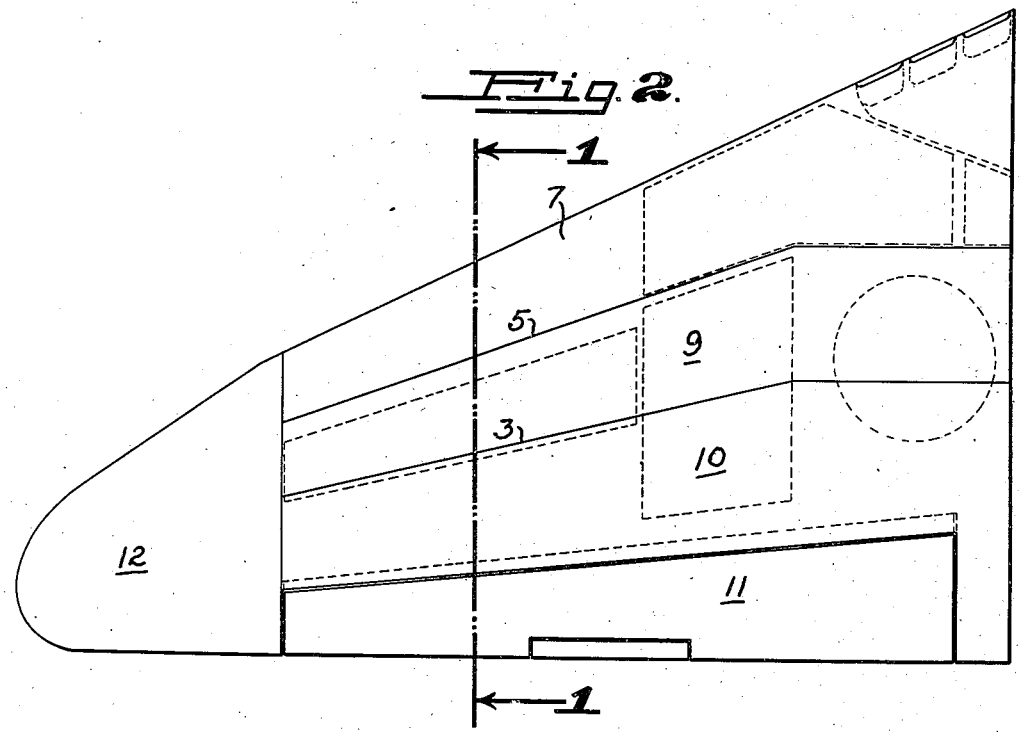
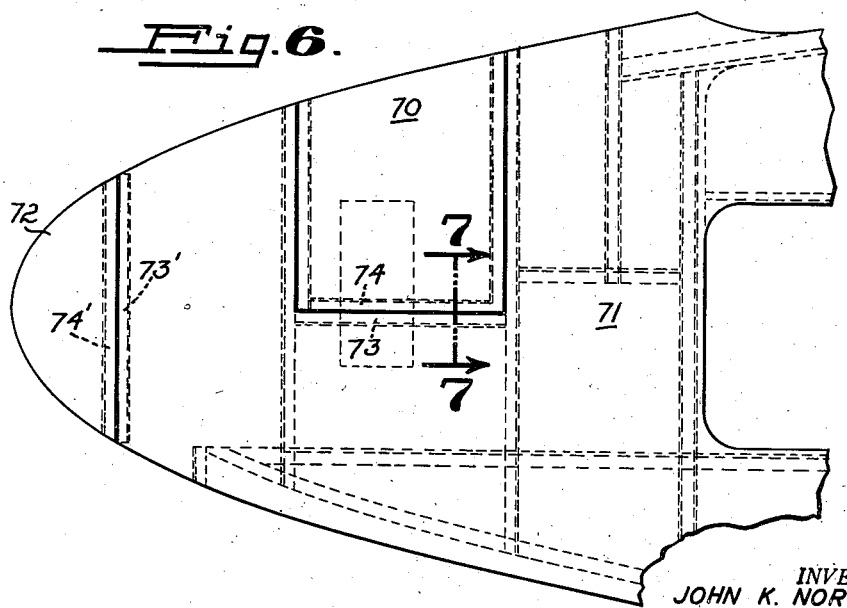

Jan. 5, 1943. J. K. NORTHROP ET AL 2,307,708
MONOCOQUE STRUCTURE
Filed June 10, 1940   4 Sheets-Sheet 3
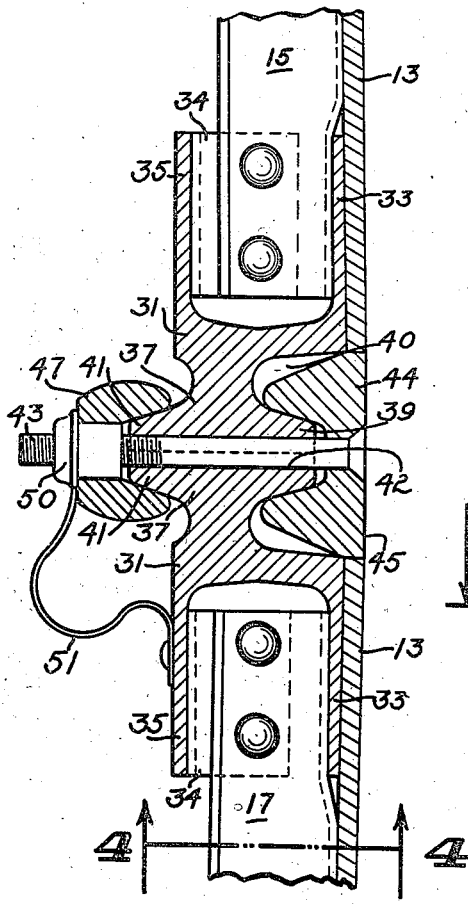
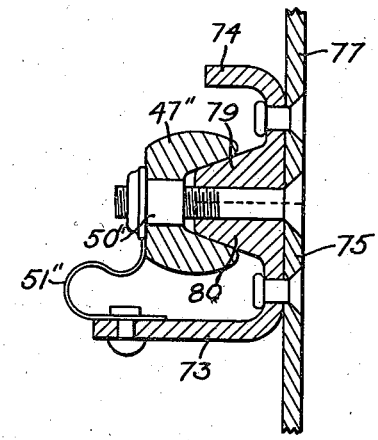
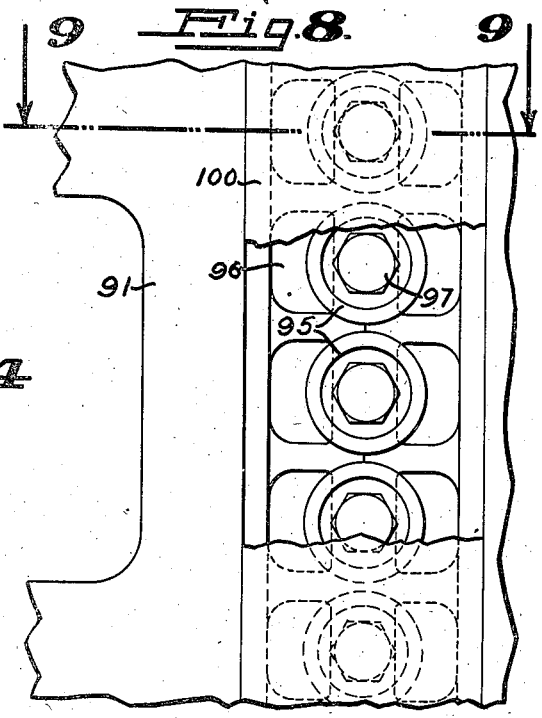
INVENTORS,
JOHN K. NORTHROP,
VLADIMIR H. PAVLECKA.
BY
Lippincott + Metcalf
ATTORNEYS.

Jan. 5, 1943.　　J. K. NORTHROP ET AL　　2,307,708
MONOCOQUE STRUCTURE
Filed June 10, 1940　　4 Sheets-Sheet 4
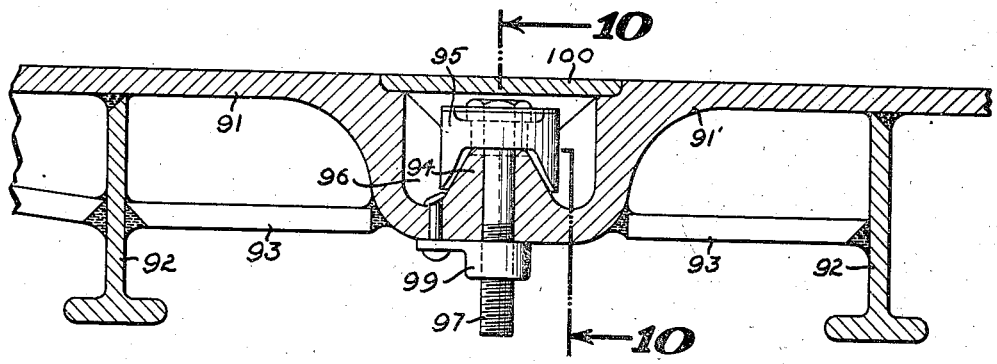
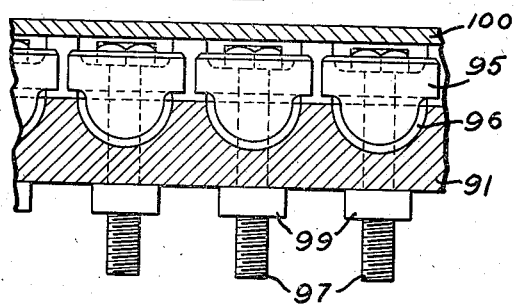
INVENTORS,
JOHN K. NORTHROP,
VLADIMIR H. PAVLECKA.
BY Lippincott & Metcalf
ATTORNEYS.

Patented Jan. 5, 1943

2,307,708

UNITED STATES PATENT OFFICE 2,307,708

MONOCOQUE STRUCTURE

John K. Northrop, Los Angeles, and Vladimir H. Pavlecka, Pacific Palisades, Calif., assignors to Northrop Aircraft, Inc., Hawthorne, Calif., a corporation of California Application June 10, 1940, Serial No. 339,646

3 Claims. (Cl. 244—124)

This invention relates to monocoque or stressed skin structures adapted for use in aircraft or other construction wherein great strength is required in combination with minimum weight, and particularly to sub-generic and specific forms of the invention described and covered broadly in our copending application, Serial No. 339,645, and filed simultaneously herewith.

The objects of this invention are, broadly, those set forth in the copending application referred to, i. e., to provide a monocoque structure which may be formed of a plurality of separable sections; to provide an intersectional joint for such structures which is readily demountable, is capable of transmitting all stresses in tension, compression, or shear to which the structure as a whole may be subjected; to provide a structure for airfoils which will permit complete dismounting of the sections and reassembly thereof to be accomplished wholly from the exterior of the structure, in order to permit easy construction, inspection, maintenance, and repair. The specific objects of the invention as here described are, in addition to those above set forth; to provide a joint between sections of a monocoque structure which forms a continuous seam and is not limited to connections between abutting ribs, formers, or arches; to provide a joint applicable to either airfoil or other structures such as fuselages or vehicle bodies; and to provide a joint which will transfer the stresses of a stressed skin structure uniformly and without concentration, so that it may be adapted not only to the connection of spanwise airfoil sections but may also be used for removable hatch covers, fuselage-wing joints, and other applications where the joint runs either transversely or parallel to the main tensional and compressive stresses in the completed assembly, with a minimum departure from the monocoque ideal and with minimum necessity for providing special frames or spars for concentrating and redistributing the stresses.

Other objects of the invention will be apparent or will be specifically pointed out in the description forming a part of this specification, but we do not limit ourselves to the embodiment of the invention herein described, as various forms may be adopted within the scope of the claims.

Considered broadly the instant invention comprises a complete structure or assembly formed of a plurality of sections, each section having a skin of sufficient thickness to carry the compressional stresses imposed thereon without material or elastic buckling. Secured to adjacent edges of contiguous sections are stringers having abutting faces formed on flanges, the abutting flanges when in opposition having a wedge-shaped section. Capping the flanges internal wedging means are provided which engage the wedge-shaped section just referred to, and are held in engagement therewith by tensioning means which preferably comprise tie-bolts extending through the joint in holes formed by coacting grooves in the abutting stringer faces, and substantially normal to the skin of the structure. It is within the scope of the invention that the internal wedging means may comprise either a bar of channel section fitting over the abutting flanges and wedging them together, or a plurality of separate wedges. The shear stresses parallel to the stringer may be carried either as shear, imparted to the bolt by the groove in which they lie, or it may be carried in part by the wedging means themselves, particularly if the latter be formed as a plurality of separate units having bearing shoulders or serrated engaging faces to which the stresses are imparted, and the flanges are formed with a plurality of projections with which these shoulders engage.

Referring to the drawings:

Fig. 2 is a plan view, on a smaller scale, of the wing shown sectionally in Fig. 1, the plane of the first figure being indicated by the line 1—1 of Fig. 2.

Fig. 3 is a detailed view, on a larger scale, showing in cross-section one of the joints illustrated in Fig. 1.

Fig. 6 is an elevation of the nose of an airplane fuselage or nacelle embodying this invention in a removable hatch cover and a detachable nose section.

Fig. 7 is a transverse sectional view of the invention as modified for the uses illustrated in Fig. 6, the plane of section being indicated by the line 7—7 in the preceding figure.

Fig. 8 is a transverse sectional view of a modified form of the invention as used for attaching a wing to a fuselage.

Fig. 9 is a longitudinal section through the joint illustrated in Fig. 8, the plane of section being indicated by the line 9—9 in Fig. 8.

Fig. 10 is a plan view of the same joint shown in Figs. 8 and 9.

Figure 1:
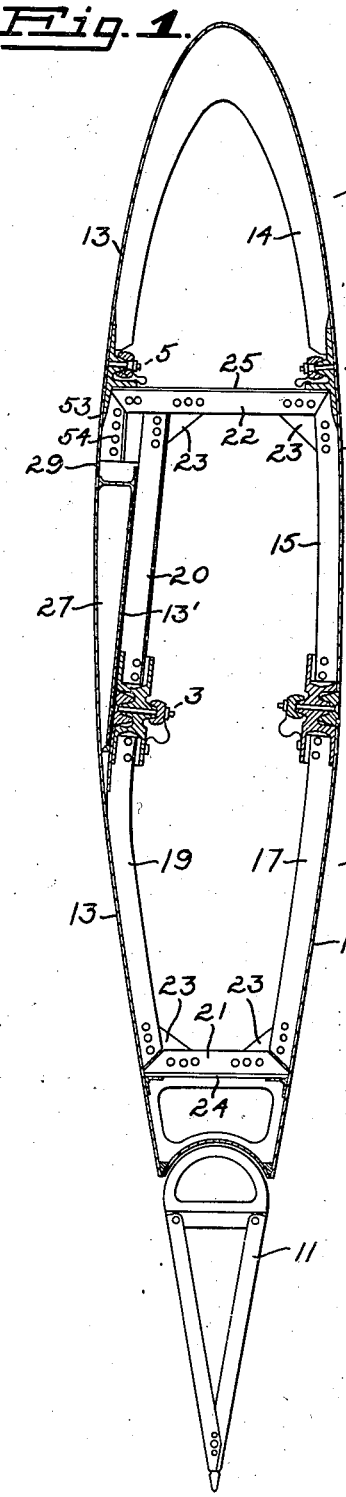
Fig. 1 is a transverse sectional view through a wing embodying this invention in several modifications.

Considering the invention in greater detail, the wing illustrated in cross-section and plan in Figs. 1 and 2 is formed of a plurality of spanwise sections, which are connected by joints 3 and 5, the latter being illustrated on a larger scale in the detailed drawings bearing figure numbers corresponding to these reference characters. The sections into which the wing is divided comprise a leading-edge section 7, a central section 9, and a trailing-edge section 10, with the ailerons 11 mounted on the trailing-edge section. The tip section 12 may be fabricated and attached in accordance with the same general principles as will be hereinafter described, but its structure will not be detailed here since it would be merely a repetition of the description of the structure of the main portion of the wing, in which portion the invention is better shown.

As in the case of the companion application each of the sections 7, 9 and 10 is of itself a self-supporting beam, comprising a stressed skin 13 which is secured either by welding or by countersunk rivets to rib arches extending transversely of the wing. In the leading or nose section 7 these rib arches take the form of pressed formers 14, of channel section. The rib arches 15, 17, 19 and 20 are more or less standard structural channels, arched as requisite to shape the wing, and are joined to struts 21 and 22 by gusset-plates 23. These struts are mounted on shear webs 24 and 25, and as they differ not at all in function and only slightly in detail from the structure which is fully described in the companion case, it is thought unnecessary to give a detailed description thereof here, it being believed that aside from the joint to which this application is particularly directed the only feature which needs comment is the landing flap 27, which is pivoted on a piano hinge located at the point indicated by the reference character 29. In order to receive this flap smoothly into the body of the airfoil the rib arch 20 is carried to an intermediate point between the ends of the strut 22, instead of being made symmetrical with the rib arch 15, and the stressed skin 13' does not form the outer surface of the airfoil in this portion of the wing. It will be seen, however, that this construction, while it varies the application of the joint slightly, does not affect its construction or the principles of its operation.

Figure 4:
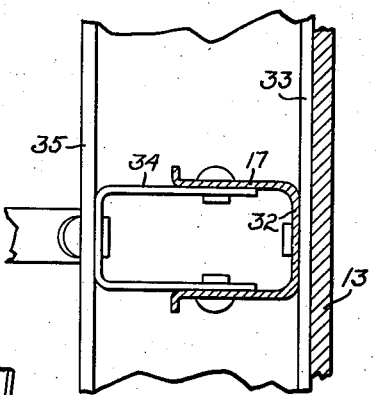
Fig. 4 is a sectional view showing the junction of the joint stringers and rib arches as illustrated in Fig. 3, the plane of section being indicated by the line 4—4 in the preceding figure.

Considering in detail the joints 3, as illustrated in the figure of the same number, the skin 13 of the abutting section is illustrated as made of one of the light magnesium alloys, such as that known in the trade as "Dowmetal J-1," to which the channel ribs 15 and 17 of similar material are affixed either by drill countersunk rivets or by welding, the riveting procedure being preferred with ribs of this cross-section. The structure is, however, applicable for use with plywood, plastic, or any other material capable of carrying the compression stresses. Secured along the abutting edge of each of the sections, by riveting or welding, is a stringer 31, which is preferably extruded from an alloy of the same character as that here used for the skin, although it could be made from duralumin or other high tensile strength alloys. The portion 70 of the stringer which is attached to the skin is preferably of channel or U-section. The ribs 15 and 17 terminate within the channel as is illustrated in Fig. 4, the junction is effected by riveting the web 32 of the rib channel 17 through both the flange 33 of the U-section of the stringer and the skin 13, and by riveting a short channel section 34, nesting within the rib 17, to both the rib and to the other flange 35 of the stringer channel.

Extending forwardly from each of the stringers is a T-shaped flanged extension 37, the top of the two T's being generally normal to the skin of the plane, and the entire extension being depressed below the skin. One of the abutting pairs of arms or flanges 39 of the T-extension thus lies in a channel 40 depressed below the skin of the structure, while the other flanges 41 project within the body of the structure, and both of the abutting flanges have a generally wedge-shaped cross-section when considered either singly or as an abutting pair, as can clearly be seen in the drawings. The faces of each of the abutting extensions are grooved at intervals in a direction perpendicular to the skin, to form holes 42 for tie-bolts 43.

Each of the two flanged junctions is capped by internal wedging means, which forces the abutting faces together. In the present case the wedges are dissimilar in cross-section, the outer wedge being a channel bar 44 which is so shaped that its outer face 45 completely fills the groove or channel 40 between the two sections, and thus forms effectively a cover strip for the joint, while the channel in its inner surface engages the wedged flanges of the stringers.

The inner channel 47 is shaped for minimum weight consistent with the necessary strength, and is drilled at intervals to receive the tie-bolt nuts 50, which are press-fitted into channel 47. These nuts are secured to spring supports 51, which are in turn fastened to one of the stringers.

In assembling the structure the wedged channel 47 is supported substantially in place by the nuts. The tie-bolts, passing through channel wedge 44, are started in the nuts, the sections 9 and 10 are placed in apposition and the tie-bolts are tightened. The two wedging channels force the abutting faces of the flanges 27 into engagement, forming a joint which is fully capable of withstanding all of the stresses imposed upon it. Compression is, of course, transmitted directly between the abutting faces of the stringers. Tension, as between adjoining sections, is carried by the wedge strips 44 and 47. Shear stresses normal to the skin of the structure are borne as tension by the tie-bolts 43, whereas shear stresses parallel to the joint are carried by these same bolts as a shear transverse to the axis of the bolt, transmitted to the bolt by the groove in which it lies. Since the stringers 31 extend the full length of the seam, and the tensional and compressive stresses are communicated directly thereto by the skin, there is no point at which the stresses are concentrated, and this is an important feature in monocoque construction.

Figure 5:
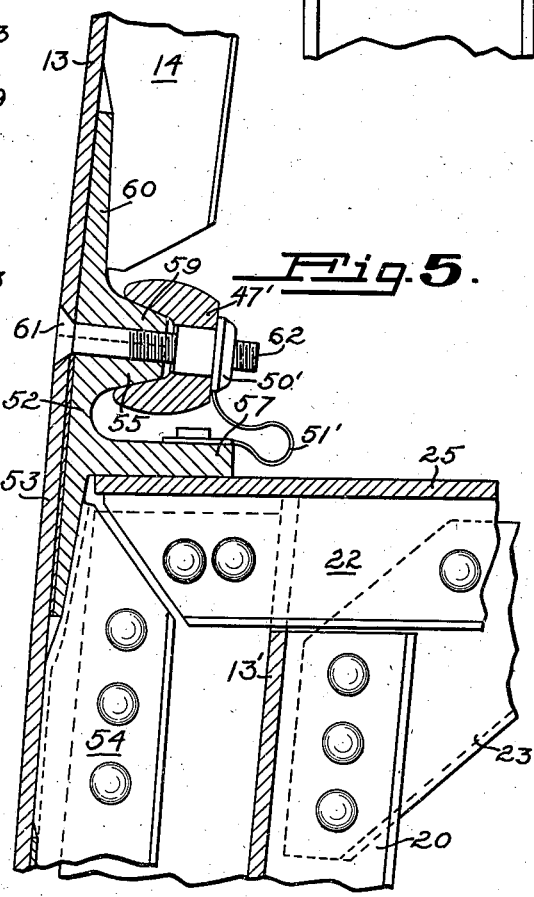
Fig. 5 is an enlarged view showing the detail of another joint embodying this invention.

The joint 5, shown in detail in Fig. 5, are essentially similar to those just described, but the stresses which they are called upon to bear being smaller the construction is lightened and simplified. In order to provide for the flap 27 the compressional stresses in the lower surface of the airfoil are carried by the inner skin 13', and are thence transmitted to the strut 22, to which both the shear web 25 and the joint stringer 52 are riveted. In order to provide both rigidity and smooth air-flow, a skin section 53 is carried back to the flap recess on stub arches 54, the skin 53 acting as a stiffening flange and assisting in transmitting the compressive stresses to the stringer 52. This stringer has only a single wedge flange 55, the stringer being essentially an angle section, although it is provided with an additional flange 57 for securing it to the shear web and strut.

The flange 55 abuts against the flange 59 of the coacting stringer, whose other flange 60 is affixed to the skin 13 of the nose section and to the nose form 14. The skins 13 of the nose section and 53 of section 9 are carried up to the line of the joint, which is countersunk at intervals to receive the heads 61 of the tie-bolts 62. The wedge strip which engages the flanges 59 is precisely similar to the wedge strip 47 used in the joint previously described and is therefore distinguished by the reference character 47', and it is tensioned by nuts 50'.

In this embodiment of the invention the joint is fully capable of carrying all the stresses in tension, compression, and shear, in the same manner as the joint of Fig. 3. It is also capable of carrying bending stresses applied counter-clockwise to the rib 14, but would not, of itself, be capable of supporting bending moments applied clockwise to this portion of the section. Since, however, the joints are used in pairs on the upper and lower surfaces of the airfoil, such clockwise bending moments would be transmitted as compressional stresses to the opposite joints, and the fastening is therefore entirely satisfactory. The internal wedges 47' prevent the joints from spreading, thereby holding the countersunk head of the tie-bolt 62 the more firmly the greater the stress applied to the tie-bolt. It is to be noted that the countersunk type of head is used on this bolt only for convenience and that other forms of the bolt heads—fillister, round or hexagonal—may be used, and countersunk, counterbored, or left projecting as requisite, although the latter is not recommended.

Where the stresses to be carried are still less, as is the case of the removable hatch cover 70 of the fuselage 71, as shown in Fig. 6, or as in the case of the removable nose section 72 of the same fuselage, the structure may be made still lighter. As shown in detail in Fig. 7, the stringers 73 and 74 are generally U-shaped, with the webs of the U riveted to the skin 75 of the fuselage proper and 77 of the hatch cover respectively. Both stringers have the wedge-shaped flanges 79 and 80 which abut and are held together by the internal wedge member 47" as in the case of the joints previously described. The primary difference between this joint and the ones above described is that both stringers are arcuate in form in those portions of the joint where it is curved to conform to the generally circular cross-section of the fuselage, the stringers 73' and 74' of the nose section being completely circular in form. The extended flange of the stringer 73 is provided both for the purpose of providing additional strength to the portion of the joint on which the greatest stress is imposed, and to provide an anchorage for the spring nut support 51".

Figs. 8, 9 and 10 show still another modification, in this case one designed particularly for welded construction, and to bear the exceedingly severe stresses imposed upon the attachment of the wing to the fuselage. In this case the stringers 91 and 91' are welded directly to the skin and are continuous therewith, and because of the duty imposed upon them, are braced at intervals to the ribs 92 by longitudinal brackets 93. The wedge-shaped abutment 94 with which the separate internal wedges 95 engage are formed in individual notches in the stringers, which together form pockets 96, spaced closely together along the length of the stringer as shown in Figs. 9 and 10. The tie-bolts 97 engage with nuts 99 which are riveted to either one of the stringers as convenience may dictate, and the joint is covered by a separate strip 100, which may be screwed, clipped, or otherwise secured in place.

This joint is somewhat more expensive than those hitherto described in that the stringers cannot be completely formed by the extrusion process, but must either be machined after extrusion or must be cast or, perhaps, forged. The principal advantage of this joint over the other forms is that additional resistance to shears longitudinally applied to the joint is given by the shoulders of the individual wedges 95 bearing against the sides of the pockets 96.

We claim:

1. A separable monocoque structure comprising a pair of contiguous sections, an exterior skin on each of said sections of sufficient thickness to withstand the compressive stresses imposed on said sections, a pair of stringers secured to the edges of the respective sections and having abutting faces, said stringers having a wedge shaped cross-section and the abutting faces thereof being formed with grooves substantially normal to the plane of said skin, each of said grooves coacting with an opposed groove to form a bolt hole, an internal wedge complementary to the wedge section of the abutted stringers engaging the same, and a bolt extending through said bolt hole and engaging said internal wedge for forcing the latter into engagement with said wedge section, the head of said bolt engaging said skin, and positioned substantially flush therewith to provide a smooth uninterrupted exterior skin surface when said stringers are engaged.

2. A separable monocoque structure comprising a pair of contiguous sections, an exterior skin on each of said sections of sufficient thickness to withstand the compressive stresses imposed on said sections, a pair of stringers secured to the edges of the respective sections and having abutting faces, said abutting faces being formed on flanged extensions of said stringers extending on the interior side of the plane of said skin, the abutting flanges having a wedge-shaped cross-section and extending beyond the opposed edges of the skin of the respective sections to form a channel therebetween when abutted, an internal wedge having an inner groove complementary to the combined wedge sections of said flanges and an outer surface flush with said skin, said latter surface being proportioned to fill the inter-edge channel, and a tensioning bolt for forcing said internal wedge and wedge section into engagement, said bolt ending flush with the outer surface of said internal wedge to provide a smooth exterior surface joining said skin edges along the contiguous level thereof.

3. A structure in accordance with claim 2 wherein the engageable surfaces of said internal wedge and of said abutting flanges are limited in length and are at a different angle than the remainder of the stringers to provide for transmission of shear stresses parallel to said skin.

JOHN K. NORTHROP.
VLADIMIR H. PAVLECKA.